United States Patent
Schmidt

(10) Patent No.: US 10,758,964 B2
(45) Date of Patent: Sep. 1, 2020

(54) METHOD FOR PRODUCING A RIVETED CONNECTION BETWEEN A BALL JOINT PIN AND A COMPONENT IN THE FORM OF A METAL SHEET AND ASSOCIATED PREFABRICATED SUBASSEMBLY

(71) Applicant: Heiko Schmidt, Lappersdorf (DE)

(72) Inventor: Heiko Schmidt, Lappersdorf (DE)

( * ) Notice: Subject to any disclaimer, the term of this patent is extended or adjusted under 35 U.S.C. 154(b) by 482 days.

(21) Appl. No.: 15/121,509

(22) PCT Filed: Apr. 13, 2015

(86) PCT No.: PCT/DE2015/100155
§ 371 (c)(1),
(2) Date: Aug. 25, 2016

(87) PCT Pub. No.: WO2015/180708
PCT Pub. Date: Dec. 3, 2015

(65) Prior Publication Data
US 2016/0361754 A1   Dec. 15, 2016

(30) Foreign Application Priority Data

May 27, 2014   (DE) .......................... 10 2014 107 462
Jul. 18, 2014   (DE) .......................... 10 2014 110 139

(51) Int. Cl.
*B21J 15/04*   (2006.01)
*F16C 11/06*   (2006.01)
(Continued)

(52) U.S. Cl.
CPC ............... *B21J 15/04* (2013.01); *B21K 25/00* (2013.01); *F16B 17/006* (2013.01); *F16C 11/0604* (2013.01); *F16C 11/0695* (2013.01)

(58) Field of Classification Search
CPC ... B21J 15/04; F16C 11/0695; F16C 11/0604; B21K 25/00; B21K 19/02; F16B 17/006; B23P 11/02
See application file for complete search history.

(56) References Cited

U.S. PATENT DOCUMENTS 2,488,902 A * 11/1949 Doyle ...................... B21J 15/04
                                                        227/15
3,491,930 A *  1/1970 Hill ......................... B21F 11/00
                                                        227/51
(Continued)

FOREIGN PATENT DOCUMENTS

DE          4228383 A1    3/1994
DE         19756469 A1    6/1999
(Continued)

*Primary Examiner* — Lawrence Averick
(74) *Attorney, Agent, or Firm* — Welsh Flaxman & Gitler LLC

(57) ABSTRACT

The invention relates to a method for producing a riveted connection between a ball joint pin, having a pin longitudinal axis (BLA), and a component in the form of a metal sheet with an abutting portion surrounding a preliminary hole, in which the ball joint pin has at least one ball head portion an adjoining shank portion, a planar plate portion, having an upper side and an underside, and a rivet flange portion, in which the ball joint pin is connected to the component by deforming the rivet flange portion. Advantageously, in a first step, the ball joint pin is inserted into the preliminary hole by means of an inserting tool in such a way that the plate portion is supported at least in certain portions by its underside on the abutting portion of the component in the form of a metal sheet, preferably with surface-area contact. In a second step, the rivet flange portion, which at least in certain portions is in the form of a hollow cylinder, is subsequently deformed in a controlled manner in the direction of the component in the form of a metal sheet by (Continued)

of a forming tool in the form of a die, in particular a riveting punch, to produce the riveted connection.

5 Claims, 5 Drawing Sheets

(51) Int. Cl.
*F16B 17/00* (2006.01)
*B21K 25/00* (2006.01)

(56) References Cited

U.S. PATENT DOCUMENTS

| | | | |
|---|---|---|---|
| 2004/0165941 A1* | 8/2004 | Yokota | B21J 9/025 403/135 |
| 2006/0204325 A1* | 9/2006 | Babej | B23P 19/062 403/278 |
| 2011/0038687 A1 | 2/2011 | Babej | |

FOREIGN PATENT DOCUMENTS

| | | |
|---|---|---|
| DE | 10015239 A1 | 10/2001 |
| DE | 102005057010 A1 | 6/2007 |
| DE | 102007044635 A1 | 4/2009 |
| DE | 102012201298 A1 | 8/2013 |
| EP | 1852212 A2 | 11/2007 |
| EP | 2039947 A2 | 3/2009 |
| FR | 1327427 | 6/1962 |
| JP | 2000210737 A | 8/2000 |
| JP | 2009275715 A | 11/2009 |
| WO | WO 2007/102416 A1 | 9/2007 |

\* cited by examiner

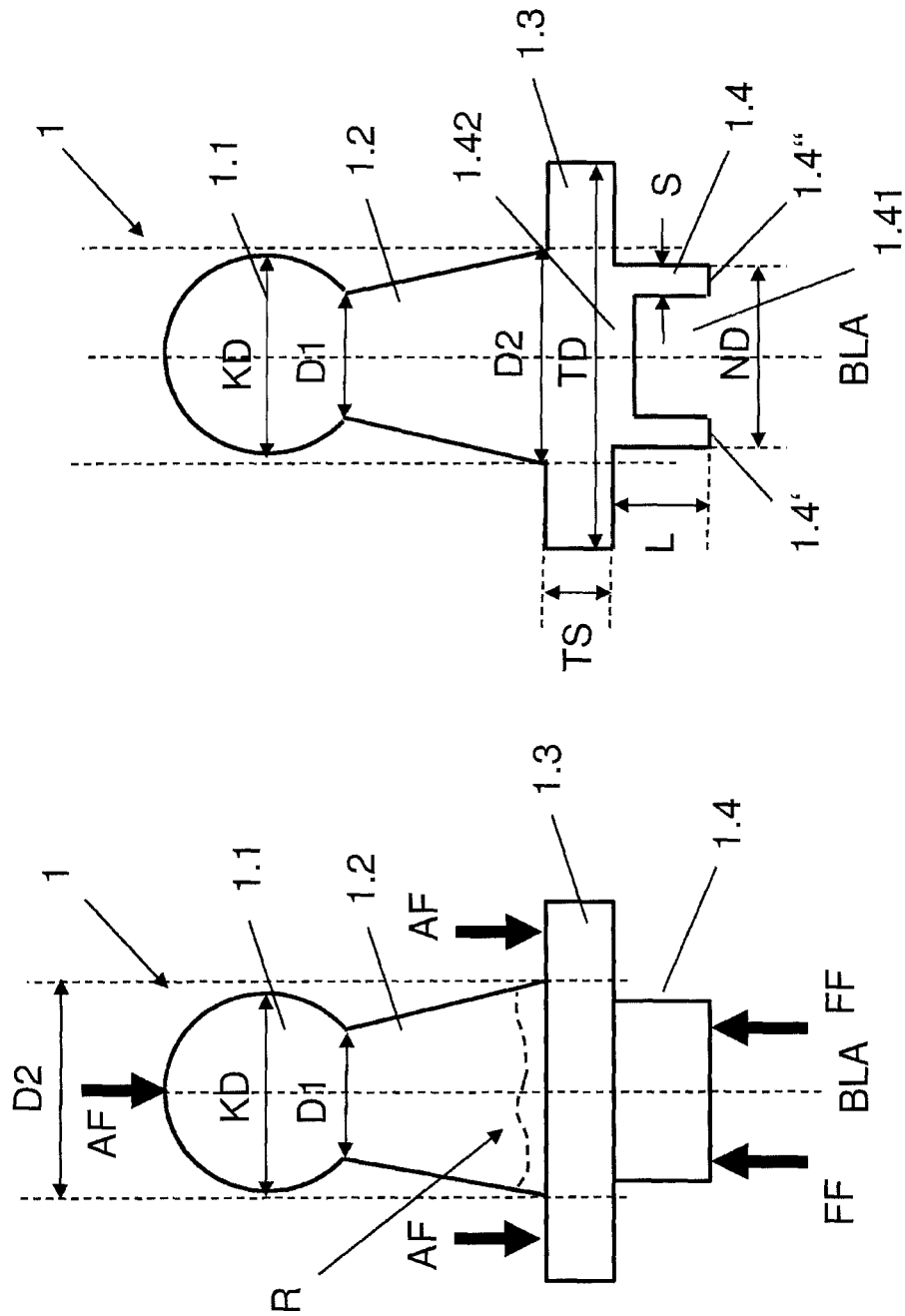

METHOD FOR PRODUCING A RIVETED CONNECTION BETWEEN A BALL JOINT PIN AND A COMPONENT IN THE FORM OF A METAL SHEET AND ASSOCIATED PREFABRICATED SUBASSEMBLY

BACKGROUND OF THE INVENTION

1. Field of the Invention

The invention relates to a method for producing a riveted connection between a ball joint pin and a component in the form of a metal sheet. The method includes a first step wherein the ball joint pin is joined into the preliminary hole by a joining tool such that an underside of the plate section of the ball joint pin is flatly supported on the contact section of the sheet metal component. The hollow-cylindrical rivet collar section is in a second step deformed in the direction of the sheet metal component in a controlled fashion by a forming die, particularly by a riveting punch, in order to produce the riveted connection.

2. Description of the Related Art

Ball joint pins are used in various fields for producing hinge joint mechanisms, particularly a hinge point or a hinged suspension. In the automotive sector, for example, these ball joint pins are used for hinge joint mechanisms of tailgates and front hoods.

In order to reduce the production steps, in the series production of products, in particular, in the series production of automobiles, it is also known to use prefabricated subassemblies such as, for example, a prefabricated subassembly comprising a sheet metal component and at least one ball joint pin preinstalled thereon for producing a hinge joint mechanism.

Known ball joint pins comprise at least one ball end section and an adjoining shaft section, wherein dependent on the respective application the shaft section is adjoined by different pin sections, particularly a connecting section for producing a connection with a sheet metal component. For example, the ball joint pin may comprise a cylindrical rivet section that adjoins the shaft section in order to produce a riveted connection with a sheet metal component, wherein the cylindrical rivet section is deformed over part of its circumference by means of wobble riveting in order to produce a riveted connection with a component, particularly in the form of a metal sheet, namely until the rivet section made of solid material is in contact with the metal sheet. Significant deformation forces are required in order to achieve the high deformation degrees necessary for cold-forming the riveting section made of solid material during the wobble riveting process. A riveted connection between a ball joint pin and a metal sheet produced by means of wobble riveting is very strong and suitable for transmitting high forces. However, cracks in the ball joint pin and therefore potential breaking points may be disadvantageously formed due to the high deformation forces required for the riveting process.

A rigid connection between a ball joint pin and a component, preferably a metal sheet, can alternatively also be produced by means of welding. Such an integral connection likewise makes it possible to transmit high forces. However, it is disadvantageous that such welding processes are not suitable for all materials and require elaborate production steps.

Conventional ball joint pins may also comprise a plate section that adjoins the shaft section and is in turn adjoined by a cylindrical connecting section that is made of solid material and comprises an external thread. The ball joint pin is inserted into an installation opening in the component, particularly a metal sheet, with its cylindrical connecting section, namely until the plate section comes in contact with the sheet metal component. Subsequently, a nut element is screwed on the external thread in order to thereby fix the ball joint pin on the sheet metal component. Although such a screw connection is capable of transmitting high forces, its implementation in series production is technically elaborate and therefore uneconomical due to the large number of required installation steps.

The above-described connecting techniques have in common that a separate production step is respectively required after the manufacturing process of the sheet metal component in order to install the ball joint pin on the component, particularly a metal sheet. The resulting high installation effort is disadvantageously associated with high costs. It would therefore be desirable to integrate the production of the riveted connection between the ball joint pin and the component, which is at least sectionally realized in the form of a metal sheet, into the manufacturing process of the sheet metal component in order to thereby eliminate subsequent production steps.

German Patent No. DE 10 2009 037 427 A1 already discloses a method for producing a riveted connection between a functional element and a sheet metal component, in which a hole is punched into the sheet metal component by a hollow-cylindrical rivet section of the functional element while it is supported on a die such that a rivet flange is produced by the die. Prior to the completion of the rivet flange, the functional element is additionally pressed downward such that a region of the hollow-cylindrical rivet section facing the shaft section is deformed into an annular lock seam that abuts on the sheet metal component on the side facing away from the rivet flange and facing the shaft section. As a result, the contact section of the sheet metal component surrounding the punched hole is deformed in such a way that it accommodates the annular lock seam in a nearly flush fashion, i.e. the annular lock seam is sunk in the sheet metal component. Since the annular lock seam is sunk in the sheet metal component, such a riveted connection disadvantageously protrudes farther from the underside of the sheet metal component and weakens the sheet metal component in the connecting region.

Based on the above-described background art, the technical problem to be solved is to provide a method for producing a riveted connection between a ball joint pin and a component in the form of a metal sheet, as well as a corresponding prefabricated subassembly consisting of a ball joint pin and a component in the form of a metal sheet, which respectively eliminates the above-described disadvantages and, in particular, allows a simple, fast and cost-efficient manufacture of prefabricated subassemblies comprising the sheet metal component and the already preinstalled ball joint pin in one manufacturing process. This problem is respectively solved with a method for producing a riveted connection between a ball joint pin and a component in the form of a metal sheet.

SUMMARY OF THE INVENTION

Some essential aspects of the method according to the invention can be seen in that the ball joint pin is in a first step joined into the preliminary hole by means of a joining tool such that the plate section, with its underside, preferably flatly rests against the contact section of the sheet metal component at least in certain sections. The at least sectionally hollow-cylindrical rivet collar section of the ball joint pin is deformed in a second step in the direction of the sheet metal component in a controlled fashion by means of a forming die, particularly a riveting punch, in order to produce the riveted connection. In the method according to the invention, it is advantageous that the riveting of the ball joint pin to the sheet metal component already takes place in the forming tool, i.e. directly during the manufacture of the sheet metal component. In this way, subsequent production steps are eliminated and significant cost savings can potentially be achieved. An expansion of the preliminary hole during the riveting process is eliminated in this case.

It is furthermore advantageous that a deformation force is applied in a controlled fashion to the rivet collar section, particularly to its hollow portion, by means of the riveting punch, and that a contact force is applied in a controlled fashion to the ball joint pin at least in the region of the upper side of the plate section and/or in the region of the ball end section by means of the joining tool. It is also preferred that the absolute value of the applied deformation force is controlled by means of a spring unit that is functionally connected to the riveting punch, preferably a pneumatic spring unit. The absolute value of the applied contact force is alternatively or additionally controlled by means of a spring unit that is functionally connected to the joining tool, preferably a pneumatic spring unit.

In an advantageous embodiment of the method, the rivet collar section, comprising a hollow portion and a solid portion, is deformed without rollers in the region of the hollow portion such that an air gap remains between the sheet metal component and the deformed sections of the hollow portion of the rivet collar section and/or the free ends of the rivet collar section are outwardly oriented away from the sheet metal component. It is particularly preferred that the hollow portion is for this purpose outwardly deformed by up to 90°, preferably between 80° and 90°, referred to the longitudinal pin axis.

In an alternate embodiment, the hollow portion of the rivet collar section may also be pre-beaded and subsequently restruck in the second step of the inventive method.

When using sheet metal components, particularly metal sheets with a small sheet thickness, these metal sheets can according to an advantageous alternate embodiment of the invention be reinforced in the region of the contact section by means of beading or by inserting a reinforcing element.

The invention also relates to a prefabricated subassembly manufactured in accordance with the method according to the invention. This prefabricated subassembly comprises at least one ball joint pin and a component in the form of a metal sheet with a contact section surrounding a preliminary hole, wherein the ball joint pin comprises at least one ball end section, an adjoining shaft section, a planar plate section with an upper side and an underside and a rivet collar section, and wherein the ball joint pin is connected to the component by deforming the rivet collar section. It is particularly advantageous that the rivet collar section is at least sectionally designed hollow-cylindrical, namely such that it comprises a hollow portion and an adjoining solid portion. In this way, a riveting process can be advantageously carried out with lower deformation forces such that the formation of microcracks in the shaft region of the ball joint pin can be effectively prevented during its connection to the sheet metal component. In this case, it is preferred that the underside of the plate section flatly contacts the contact section of the sheet metal component.

For this purpose, the ball joint pin is preferably joined into the preliminary hole in such a way that the plate section rests with its underside, at least sectionally, against the contact section of the sheet metal component. The at least sectionally hollow-cylindrical rivet collar section is deformed in the direction of the sheet metal component, namely such that the hollow portion points outward by up to 90°, preferably between 80° and 90°, referred to the longitudinal pin axis.

In a preferred embodiment, the shaft section of the ball joint pin is designed conical and/or the plate section is designed discoidal. This likewise results in an optimized force distribution during the joining and riveting of the ball joint pin.

It is furthermore advantageous that the outside diameter of the rivet collar section is smaller than the largest diameter of the shaft section or smaller than or equal to the ball diameter of the ball end section. In this way, the preliminary hole can be dimensioned smaller such that the stability, in particular, of sheet metal components with a small sheet thickness is increased accordingly.

The longitudinal dimension of the solid portion of the rivet collar section approximately corresponds to the sheet thickness of the sheet metal component, wherein the wall thickness of the rivet collar section in the region of the hollow portion lies between 0.5 mm and 2.5 mm.

In the context of the invention, the terms "approximately," "essentially" or "about" refer to deviations from the respective exact value by ±10%, preferably ±5%, and/or to deviations in the form of variations that are inconsequential to the function.

Developments, advantages and potential applications of the invention arise from the following description of exemplary embodiments and from the figures. In this respect, all described and/or graphically illustrated characteristics basically form the object of the invention individually or in arbitrary combinations.

BRIEF DESCRIPTION OF THE DRAWINGS

The invention is described in greater detail below with reference to exemplary embodiments illustrated in the figures. In these figures:

FIG. 1 shows a schematic side view of a ball joint pin according to the invention, FIG. 2 shows a longitudinal section through a ball joint pin according to the invention.

DETAILED DESCRIPTION OF THE INVENTION

Figure 3:
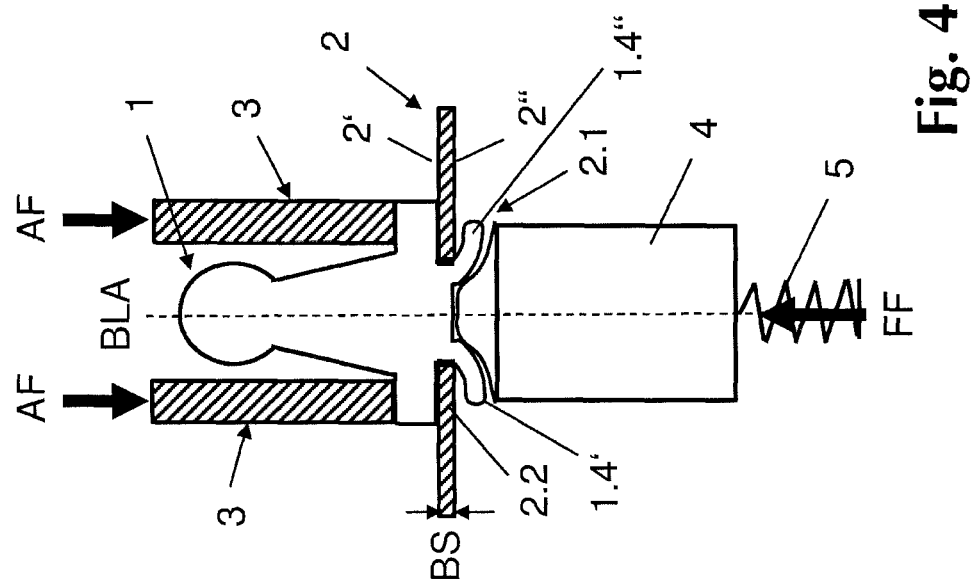
FIG. 3 shows a schematic section through a ball joint pin that is accommodated in a joining tool and connected to the sheet metal component by joining.

FIG. 1 shows an example of a ball joint pin 1 according to the invention that is preferably realized in one piece. For example, the ball joint pin 1 is made of metal or a metal alloy.

The ball joint pin 1 according to the invention extends along a longitudinal pin axis BLA and comprises at least one ball end section 1.1, an adjoining shaft section 1.2, which is followed by a planar plate section 1.3 with an upper side and an underside 1.31, 1.32 and an at least sectionally hollow-cylindrical rivet collar section 1.4 adjoining the plate section along the longitudinal pin axis BLA. In a preferred embodiment, the rivet collar section 1.4 comprises a hollow portion 1.41 and a solid portion 1.42. FIG. 2 shows a schematic longitudinal section through the ball joint pin 1.

The shaft section 1.2 is preferably configured to be conical, i.e. the shaft section 1.2 has a circular cross section and a diameter D that increases along the longitudinal pin axis BLA, wherein the diameter D particularly increases along the longitudinal pin axis BLA from a first diameter D1 at the ball end section 1.1 to a second diameter D2 at the plate section 1.3. In one embodiment, the second diameter D2 in the region of the plate section 1.3 approximately corresponds to or is designed to be larger than the ball diameter KD of the ball end section 1.1. The second diameter D2 of the shaft section 1.2 in the region of the plate section 1.3 may lie, for example, between the ball diameter KD of the ball end section 1.1 and 1.2-times this ball diameter. For example, the first diameter D1 lies between 0.5 mm and 1.4 mm and the second diameter D2 lies between 0.8 and 1.4 mm. A ball diameter KD between 0.8 mm and 1.2 mm is preferably provided. The dimensions of the ball end section 1.1, particularly its ball diameter KD, are largely standardized and therefore defined.

The plate section 1.3 is configured to be discoidal such that the upper side and the underside 1.31, 1.32 of the plate section 1.3 extend parallel to one another and respectively form surfaces or contact surfaces that annularly surround the shaft section 1.2 and the rivet section 1.4. The upper side and the underside 1.31, 1.32 respectively extend in a plane that lies perpendicular to the longitudinal pin axis BLA. For example, the plate diameter TD of the plate section 1.3 lies between 1.5-times and 2-times the ball diameter KD, preferably between 1.2 mm and 2.5 mm. The plate thickness TS of the plate section 1.3 along the longitudinal pin axis BLA lies, for example, between 1.5 mm and 5.0 mm.

The at least sectionally hollow-cylindrical rivet collar section 1.4 preferably has an outside diameter ND that is smaller than the second diameter D2 of the shaft section 1.2. For example, the hollow portion 1.41 of the rivet collar section 1.4 extends at least over half the length L of the rivet collar section 1.4 facing away from the plate section 1.3, i.e. the hollow portion extends over at least half of the rivet collar section 1.4. In this context, the length L is dependent on the sheet thickness BS of the sheet metal component 2. For example, the sheet thickness BS lies between 0.7 mm and 5.0 mm.

The wall thickness S of the rivet collar section 1.4 in the region of the hollow portion 1.41 lies between 0.5 mm and 2.5 mm. In this case, the hollow-cylindrical rivet collar section 1.4 extends concentrically to the longitudinal pin axis BLA. For example, the hollow portion 1.41 extends over ⅔ of the length L and the remaining solid portion 1.42 of the rivet collar section 1.4 extends over at least ⅓ of the length L. In an advantageous embodiment, the longitudinal dimension of the solid portion 1.42 of the rivet collar section 1.4 approximately corresponds to the sheet thickness BS of the sheet metal component 2, with which the riveted connection should be produced. It is particularly preferred that the longitudinal dimension of the solid portion 1.42 is smaller than or equal to the sum of the wall thickness S of the rivet collar section 1.4 in the region of the hollow portion 1.41 and the sheet thickness BS minus the height of a forming die, particularly a riveting punch 4.

The method according to the invention relates to the production of riveted connections between such a ball joint pin 1 and a sheet metal component 2, preferably a metal sheet or formed metal sheet that is preferably part of a prefabricated subassembly. Such a prefabricated subassembly is used, for example, in the series production of products, for example automobiles in order to reduce the depth of production, to shorten the production time and to thereby achieve cost savings. The method according to the invention makes it possible to already incorporate the ball joint pin 1 into the sheet metal component 2 during its manufacturing process, particularly during the forming process of the sheet metal component 2, i.e. the method for producing the riveted connection is integrated into the manufacturing or forming process of the sheet metal component into a prefabricated subassembly such that enormous cost savings can be achieved.

A preliminary hole 2.1, which is surrounded by a contact section 2.2, is produced in the sheet metal component 2 having an upper side and an underside 2', 2" in order to install the ball joint pin 1. The contact section 2.2 is preferably designed planar and/or for flatly contacting the underside 1.32 of the plate section 1.3. The diameter of the preliminary hole 2.1 is preferably smaller than the outside diameter ND of the rivet collar section 1.4.

According to the invention, the ball joint pin 1 is in a first step joined into the at least one preliminary hole 2.1 in the sheet metal component 2 by means of a joining tool 3 such that the planar plate section 1.3 provided between the shaft section 1.2 and the rivet collar section 1.4 is preferably supported flatly on the contact section 2.2 of the sheet metal component 2 with its underside 1.32 and thereby presses the pin against the upper side 2' of the sheet metal component with a contact force AF. In a second step, the at least sectionally hollow-cylindrical rivet collar section 1.4 is deformed in a controlled fashion in the direction of the sheet metal component 2 by means of a forming die, particularly a riveting punch 4, in order to produce the riveted connection, wherein the riveting punch 4 is for this purpose particularly moved in the direction of the rivet collar section 1.4 in a controlled fashion along the longitudinal pin axis BLA. A controlled displacement of the sheet metal component 2 with the ball joint pin 1 joined therein would alternatively also be conceivable. As a result, the rivet collar section 1.4 is acted upon with a deformation force FF that can be adjusted, for example, by means of a spring unit 5, 6, particularly a pneumatic spring unit. The spring unit 5, 6 may be functionally connected to the riveting punch 4 and/or the joining tool 3.

Figure 4:
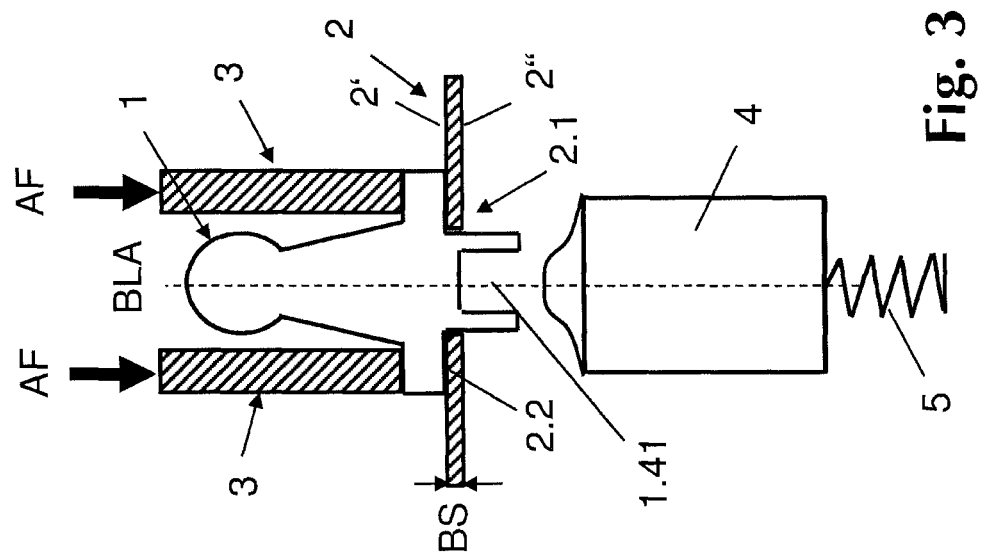
FIG. 4 shows a schematic section through the arrangement of the ball joint pin and the sheet metal component according to FIG. 3 after the riveting process.

FIGS. 3 and 4 show examples of the first and the second step of the method according to the invention, namely the joining of the ball joint pin 1 into the preliminary hole 2.1 in the sheet metal component 2 along the longitudinal pin axis BLA extending perpendicular to the upper side 2' of the sheet metal component 2. The deformation of the rivet collar section 1.4 then takes place in the second step due to a controlled application of the deformation force FF by means of the spring unit 5 in such a metered fashion that the formation of microcracks R can be effectively prevented in the region of the shaft section 1.2 of the ball joint pin 1, namely while the contact force AF is maintained by supporting the ball joint pin 1 at least in the region of the upper side 1.31 of the plate section 1.3, the underside 1.32 of which contacts the upper side 2' of the sheet metal component 2 in the contact section 2.2. Particularly the tensions in the shaft section 1.2 of the ball joint pin 1 resulting from the deviating lines of force of the contact force AF and the deformation force FF are effectively reduced due to the controlled application of the deformation and/or contact forces AF, FF in accordance with the invention.

The ball joint pin 1 is joined into the preliminary hole 2.1 of the sheet metal component 2 without noteworthy deformation of the contact section 2.2 of the component 2, i.e. without sinking the plate section 1.3 of the ball joint pin 1 into the planar contact section 2.2 of the sheet metal component 2.

The application of the contact force AF by means of the joining tool 3 may alternatively or additionally take place in a controlled fashion, for example, by means of a spring unit 6 that is functionally connected to the joining tool 3.

Figure 5:
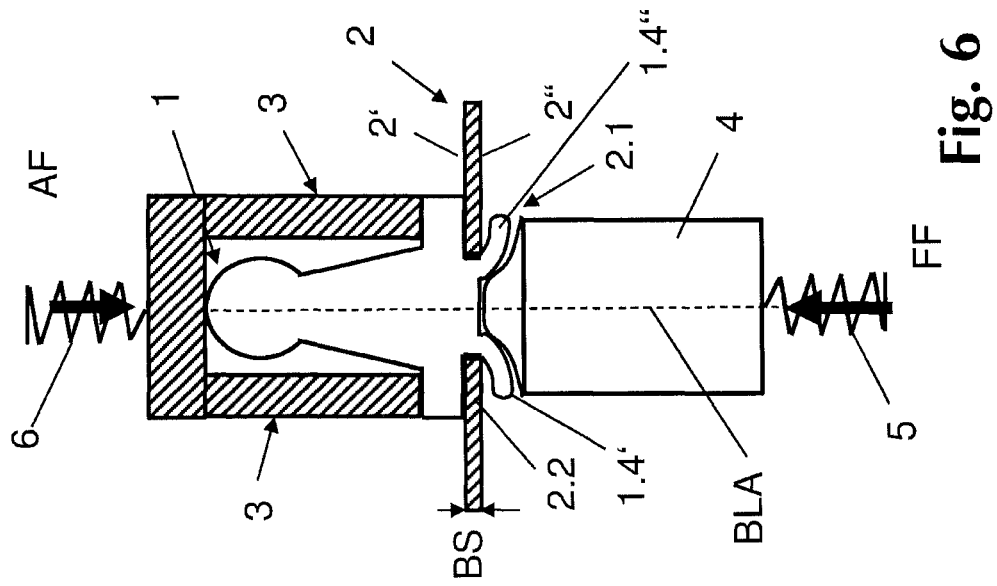
FIG. 5 shows a schematic section through a ball joint pin that is accommodated in an alternative joining tool and connected to the sheet metal component by joining.
Figure 6:
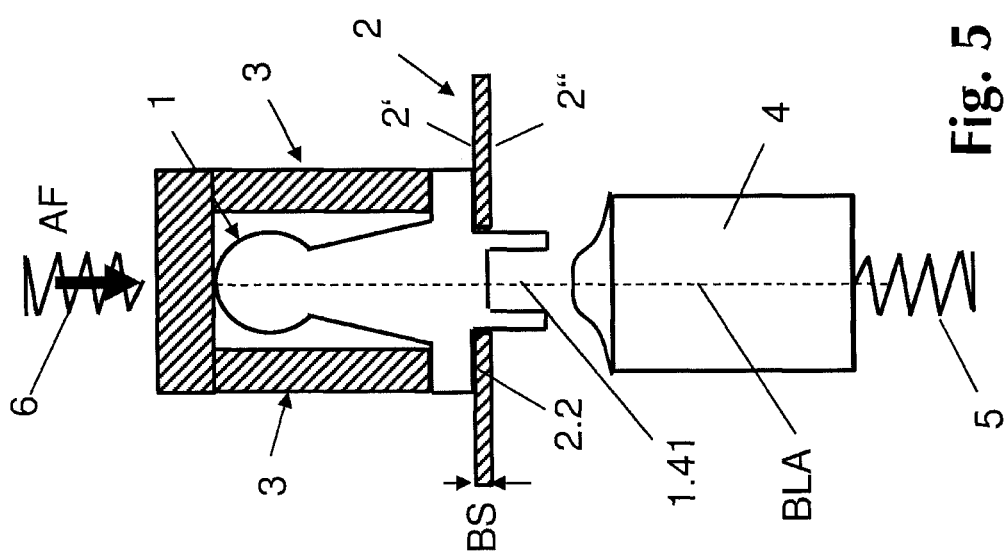
FIG. 6 shows a schematic section through the arrangement of the ball joint pin and the sheet metal component according to FIG. 5 after the riveting process.

FIGS. 5 and 6 show an alternative embodiment of the joining tool 3, in which the contact force AF is not only applied to the ball joint pin 1 in a controlled fashion in the region of the upper side 1.31 of the plate section 1.3, but also in the region of the ball end section 1.1. For this purpose, the joining tool 3 is designed in a sleeve-like fashion at least in the region functionally connected to the ball joint pin 1 and is supported on the upper side 1.31 of the plate section 1.3 with the free end regions, as well as on the ball end section 1.1 with the inner sleeve surface. The controlled application of the contact force AF to the ball joint pin 1 by means of the joining tool 3 for joining the ball joint pin into the preliminary hole 2.1 of the sheet metal component 2 is realized with the aid of a spring unit 6. In the present exemplary embodiment according to FIGS. 5 and 6, two spring units 5, 6 are respectively provided. However, it goes without saying that only one of the spring units 5 or 6 may alternatively be used for realizing the controlled application of the contact force AF and/or the deformation force FF in accordance with the invention.

Figure 7:
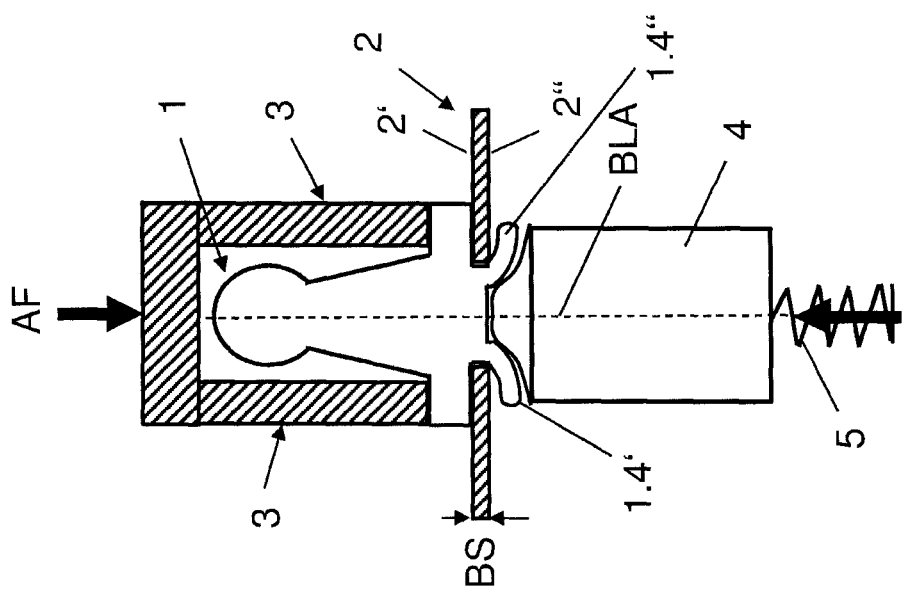
FIG. 7 shows a schematic section through an alternative arrangement of the ball joint pin and the sheet metal component after the riveting process.
Figure 10:
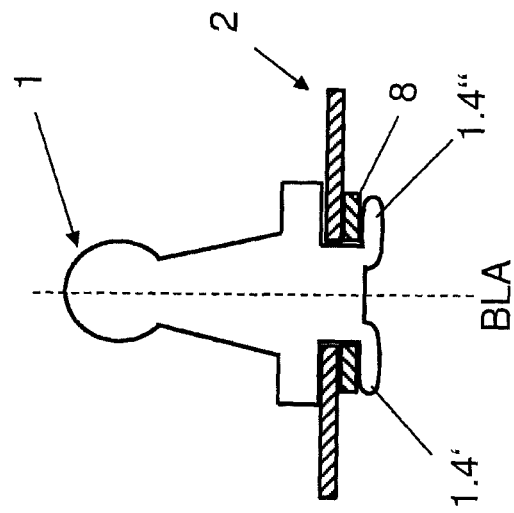
FIG. 10 shows a schematic section through a riveted connection between a ball joint pin and a sheet metal component produced in accordance with the invention with a reinforcing element.

In the alternative embodiment according to FIG. 7, the joining tool 3 is in fact also realized in a sleeve-like fashion, but the inner sleeve surface is not supported on the ball end section 1.1. In addition, the contact force AF is also applied without a spring unit 6. Consequently, the applied forces AF, FF are exclusively controlled by means of the spring unit 5 that is functionally connected to the riveting punch 4.

In another embodiment that is not illustrated in the figures, a spring-loaded support of the ball joint pin 1 by means of a correspondingly designed two-part joining tool 3 may also be realized in the region of the ball end section 1.1 only, i.e., the support in the region of the upper side 1.32 of the plate section 1.3 is not realized in a spring-loaded fashion.

According to the invention, the rivet collar section 1.4 is deformed without rollers in such a way that an air gap remains between the underside 2" of the sheet metal component 2 and the deformed sections of the rivet collar section 1.4, namely at least between the free end regions 1.4', 1.4" of the rivet collar section 1.4 and the underside 2" of the sheet metal component 2. In this case, the free end regions 1.4', 1.4" of the rivet collar section 1.4 are oriented outward and point away from the underside 2" of the sheet metal component 2. In the method according to the invention, the rivet collar section 1.4 is outwardly deformed by up to 90°, preferably between 80° and 90°, referred to the longitudinal pin axis BLA and the hollow portion 1.41 of the rivet collar section 1.4 is thereby expanded.

In a preferred embodiment, the rivet collar section 1.4 is in the second step of the inventive method initially pre-beaded and the pre-beaded rivet collar section 1.4 is subsequently restruck by means of a suitable processing tool 7 in order to ensure that the pre-beaded section of the rivet collar section 1.4 flatly contacts the underside 2" of the sheet metal component 2.

Figure 8:
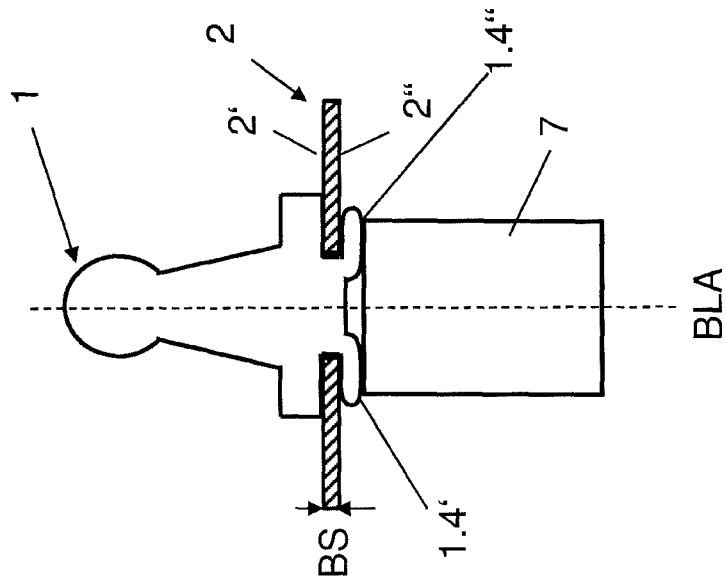
FIG. 8 shows a schematic section through a riveted connection between a ball joint pin and a sheet metal component produced in accordance with the invention after a subsequent processing of a pre-beaded rivet section by means of restriking.

FIG. 8 shows a section through a prefabricated subassembly comprising a sheet metal component 2 that is riveted to a ball joint pin 1 in accordance with the invention, wherein the pre-beaded sections of the rivet collar section 1.4 of said ball joint pin are restruck by means of the processing tool 7. The aforementioned deformation steps may be realized by means of one or more forming stations.

In an embodiment that is not illustrated in the figures, the contact section 2.2 around the preliminary hole 2.1 may be at least slightly curved upward or downward referred to the upper side or underside 2', 2" of the sheet metal component 2 before the inventive method is carried out. The grommet of the contact section 2.2 surrounding the preliminary hole 2.1 is transferred into the planar state again after the joining and riveting processes have been carried out such that the underside 1.32 of the plate section 1.3 once again flatly contacts the upper side 2' of the sheet metal component 2.

Figure 9:
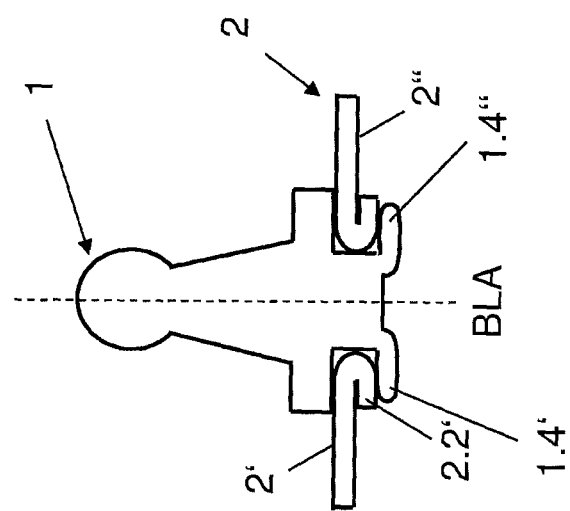
FIG. 9 shows a schematic section through a riveted connection between a ball joint pin and a sheet metal component produced in accordance with the invention with reinforced contact sections.

When using particularly thin sheet metal components 2, for example, with a sheet thickness BS between 0.7 mm and 1.5 mm, the contact section 2.2 is reinforced by doubling the sheet metal thickness BS, namely by correspondingly beading or folding over the sheet metal component in the contact section 2.2 in accordance with FIG. 9 such that a reinforced contact section 2.2' is formed. Beading of the contact section 2.2 is carried out, for example, if the sheet thickness BS is smaller than 1.5 mm, namely in dependence on the forces to be transmitted.

It would alternatively be possible to use an additional discoidal reinforcing element 8 such as, for example, a reinforcing metal sheet that is inserted between the deformed sections of the rivet collar section 1.4 and the underside 2" of the sheet metal component 2. The discoidal reinforcing element 8 preferably has a thickness of at least 1 mm.

The invention was described above with reference to exemplary embodiments. It goes without saying that numerous variations and modifications are possible without thereby deviating from the scope of the invention.

REFERENCE LIST

1 Ball joint pin
1.1 Ball end section
1.2 Shaft section
1.3 Plate section
1.31 Upper side
1.32 Underside
1.4 Rivet collar section
1.41 Hollow portion
1.42 Solid portion
1.4', 1.4" Free end regions
2 Sheet metal component 2' Upper side
2" Underside
2.1 Preliminary hole
2.2 Contact section
2.2' Reinforced contact section
3 Joining tool
4 Riveting punch
5 Spring unit
6 Spring unit
7 Processing tool
8 Reinforcing element
AF Contact force
BLA Longitudinal pin axis
BS Sheet thickness
D Diameter
D1 First diameter
D2 Second diameter
FF Deformation force
L Length
ND Outside diameter
S Wall thickness
TS Plate thickness
TD Plate diameter
R Microcracks

The invention claimed is:

1. A method for producing a riveted connection between a ball joint pin having a longitudinal pin axis (BLA) and a sheet metal component having a contact section that surrounds a preliminary hole, wherein the ball joint pin comprises at least a ball end section, an adjoining shaft section, a planar plate section comprising an upper side of the planar plate section and an underside of the planar plate section, and a sectionally hollow-cylindrical rivet collar section, and wherein the ball joint pin is connected to the sheet metal component by deforming the sectionally hollow-cylindrical rivet collar section, comprising the following steps in order of:
   (a) joining the ball joint pin into the preliminary hole using a sleeve shaped joining tool such that there is applied a controlled application of contact force and reaction force directly to the ball joint pin by the sleeve shaped joining tool for joining the ball joint pin into the preliminary hole of the sheet metal component such that the planar plate section has the underside of the planar plate section at least sectionally supported flatly on the contact section of the sheet metal component;
   (b) deforming the sectionally hollow-cylindrical rivet collar section in a direction of the sheet metal component in a controlled fashion by a beaded forming die or a riveting punch, while the ball joint pin is being held in place by the sleeve shaped joining tool, in order to produce the riveted connection, wherein an applied deformation force is applied to the sectionally hollow-cylindrical rivet collar section in a controlled fashion by the beaded forming die or riveting punch, and wherein a hollow portion of the sectionally hollow-cylindrical rivet collar section is pre-beaded by the beaded riveting punch forming a pre-beaded rivet collar section;
   (c) removing the sleeve shaped joining tool; and
   (d) then striking the pre-beaded rivet collar section with a processing tool to ensure that the pre-beaded rivet collar section flatly contacts an underside of the sheet metal component, wherein the sectionally hollow-cylindrical rivet collar section comprises a hollow portion and a solid portion, and the sectionally hollow-cylindrical rivet collar section is deformed without rollers in a region of the hollow portion such that an air gap remains between the sheet metal component and deformed sections of the hollow portion of the sectionally hollow-cylindrical rivet collar section and/or free ends of the sectionally hollow-cylindrical rivet collar section, and wherein the hollow portion of the sectionally hollow-cylindrical rivet collar section is outwardly deformed between 80° and 90° from the longitudinal pin axis (BLA).

2. The method according to claim 1, wherein an applied contact force (AF) is applied to the ball joint pin in a controlled fashion at least in a region of the upper side of the plate section and/or in a region of the ball end section by the joining tool.

3. The method according to claim 2, wherein an absolute value of the applied contact force (AF) is controlled by a spring unit or pneumatic spring unit that is functionally connected to the joining tool.

4. The method according to claim 1, wherein an absolute value of the applied deformation force (FF) is controlled by a spring unit or pneumatic spring unit that is functionally connected to the riveting punch.

5. The method according to claim 1, wherein the method produces a prefabricated assembly comprising a ball joint pin and a sheet metal component having a contact section surrounding a preliminary hole, wherein the ball joint pin comprises a ball end section, an adjoining shaft section, a planar plate section with an upper side and an underside and a rivet collar section, and wherein the ball joint pin is connected to the sheet metal component by deforming the rivet collar section, and wherein the rivet collar section is sectionally designed as a sectionally hollow-cylinder rivet collar section.

* * * * *